United States Patent
Pilgram et al.

(10) Patent No.: US 7,433,394 B2
(45) Date of Patent: Oct. 7, 2008

(54) TRANSMITTING/RECEIVING ARRANGEMENT, AND A METHOD FOR BIDIRECTIONAL TRANSMISSION OF DATA VIA A DIGITAL INTERFACE IN A RADIO

(75) Inventors: Berndt Pilgram, München (DE); Dietmar Wenzel, München (DE)

(73) Assignee: Infineon Technologies AG (DE)

( * ) Notice: Subject to any disclaimer, the term of this patent is extended or adjusted under 35 U.S.C. 154(b) by 633 days.

(21) Appl. No.: 10/902,530

(22) Filed: Jul. 29, 2004

(65) Prior Publication Data

US 2005/0032533 A1 Feb. 10, 2005

(30) Foreign Application Priority Data

Jul. 30, 2003 (DE) ................. 103 34 838

(51) Int. Cl.
*H04L 5/16* (2006.01)
(52) U.S. Cl. .............. 375/220; 375/222; 375/362; 375/368; 370/278; 370/905
(58) Field of Classification Search .............. 375/295, 375/316, 354, 355, 362, 364, 219, 220, 222; 370/278, 503, 282, 302, 395.64, 905; 714/707; 713/500–503
See application file for complete search history.

(56) References Cited

U.S. PATENT DOCUMENTS

| | | | | |
|---|---|---|---|---|
| 3,696,338 A | * | 10/1972 | Preiss ......................... | 710/60 |
| 3,980,993 A | * | 9/1976 | Bredart et al. .............. | 713/501 |
| 5,974,103 A | | 10/1999 | Williams .................... | 375/356 |
| 6,092,129 A | * | 7/2000 | Smith et al. .................. | 710/60 |
| 6,202,116 B1 | | 3/2001 | Hewitt ........................ | 710/129 |
| 6,778,556 B1 | | 8/2004 | Chin et al. .................. | 370/468 |
| 2002/0064222 A1 | | 5/2002 | Liu et al. ..................... | 375/222 |
| 2004/0097250 A1 | | 5/2004 | Gunzelmann et al. ....... | 455/502 |

FOREIGN PATENT DOCUMENTS

| | | |
|---|---|---|
| CN | 1190854 | 8/1998 |
| DE | 101 22 196 A1 | 12/2002 |
| WO | WO 99/23787 | 5/1999 |
| WO | 02091601 | 11/2002 |

* cited by examiner

*Primary Examiner*—Dac V Ha
(74) *Attorney, Agent, or Firm*—Dickstein, Shapiro, LLP

(57) ABSTRACT

A transmitting/receiving arrangement comprises a baseband module (1) and a radio-frequency module (3), which are connected to one another via a bidirectional data line (21) and a bit clock line (22) of a digital interface (2). In order to eliminate the influence of delay loops during the transmission of data in the opposite direction to the bit clock either the data bits are transmitted repeatedly or a bit clock frequency is set which is lower than the bit clock frequency for rectified transmission of bit clock signal and data signal.

32 Claims, 4 Drawing Sheets

TRANSMITTING/RECEIVING ARRANGEMENT, AND A METHOD FOR BIDIRECTIONAL TRANSMISSION OF DATA VIA A DIGITAL INTERFACE IN A RADIO

PRIORITY

This application claims priority to German application no. 103 34 838.7 filed Jul. 30, 2003.

TECHNICAL FIELD OF THE INVENTION

The present invention relates to a method for bidirectional transmission of data via a digital interface between two signal processing units in a radio, in particular, a mobile radio. The invention also relates to a transmitting/receiving arrangement, which is designed for bidirectional transmission of data via a digital interface between two signal processors in a radio, in particular a mobile radio.

BACKGROUND OF THE INVENTION

Modulators and demodulators which modulate a carrier oscillation and received data on the basis of standardized modulation and demodulation methods depending on the data to be transmitted, and which demodulate received data in a corresponding manner, are used within transmitting and receiving devices in mobile radios. Known modulation and demodulation methods include, for example, GSM (Global System for Mobile Communication), EDGE (Enhanced Data Rate for GSM Evolution), TIA-EIA 136 (Telecommunication Industry Associations/Electronic Industry Association), UTRA FDD (UMTS-Terrestrial Radio Access Frequency Division Duplex), UTRA TDD (UMTS-Terrestrial Radio Access Time Division Duplex), and IS-95. In general, the modulators and demodulators comprise two or more functional units, for example a baseband module (which produces a signal which complies with a standard, generally a complex-value signal) from the data to be transmitted with the aid of digital signal processing, and a radio-frequency module, which shifts this complex-value signal to a radio frequency and transmits it as a real-value signal with suitable amplification via an antenna. The received payload data is demodulated in a corresponding manner by the radio-frequency module to form a complex-value signal, and the received, demodulated data is processed further in a baseband module.

Different physical requirements for the baseband and radio control frequency module result in these functional units of the vehicle being formed in separate integrated circuits, using different manufacturing technologies. In the transmission direction, the modulating baseband signal must be transmitted in a suitable form to the radio-frequency module. In the receiving direction, the demodulating radio-frequency signal must be transmitted to the baseband module in a suitable form. In this case, a suitable interface may be provided between the baseband module and the radio-frequency module, and may be in the form of an analogue signal interface. In this case, the baseband signals are normally produced at this analogue interface in the form of complex-value baseband signals, which are broken down into a real part and an imaginary part as a so-called I/Q signal with an in-phase component and a quadrature component, which is shifted through 90° with respect to it. The I and Q components are introduced generally in each case transmitted as a difference signal, so that two lines must in turn be provided in each case for the transmission of each of the components.

Furthermore, the German Patent Application with the file reference 103 01 303.2, which represents a prior art in accordance with § 3 Clause 2 Patent Act, describes a transmitting/receiving arrangement for mobile radio use, in which the interface between the baseband module and the radio-frequency module is in a completely digital form. However, relatively high data rates occur for data transmission in a digital interface such as this. Bit clock frequencies of 26 MHz are used for data transmission in this case.

In the case of bidirectional data transmission, in which only a single data line is used alternately for both transmission directions between the baseband module and the radio-frequency module, and, furthermore, a single bit clock as well as a single word clock are used, the bit clock line and the word clock line being operated in only one fixed, predetermined direction, a distinction must be drawn to it in two cases. The first case is characterised in that the data line as well as the bit clock line and the word clock line are operated in the same transmission direction. The second case is characterized in that the data line is operated in the opposite transmission direction to the bit clock line and to the word clock line.

If the physical signal delay times are considered, then there is a significant difference between the two situations that have been mentioned. The physical signal delay times are governed essentially firstly by the lengths of the signal lines between the baseband module and the radio-frequency module and secondly by the so-called "pad" delay times. The "pad" delay times are time delays which occur in the signal being transmitted from the chip interior via the electrical "bonding" connection, via the substrate of the housing and the pin connection of the housing, as well as connections to the conductor tracks of a board on which the chip is mounted. This applies in an analogous manner to the signal delay times where the signal is transmitted from the outside into the chip interior.

In order to make it possible to ensure high-speed data transmission, it is necessary for no delay time differences to occur between the data signals, the bit clock signals and the word clock signals. The greater the delay time difference between the signals, and/or the greater the shift between the flanks of a data signal and the flanks of a bit clock signal and/or a word clock signal, the lower is the probability that the data can be sampled and received correctly at the reception end. This problem of delay time difference limits the transmission rate because the greater the delay time differences which occur the less data can be transmitted per unit time.

If the cases mentioned above are considered in terms of the transmission direction of the signals, then, in the first case, all the signal connections are aligned in the same direction. All the transmitted signals are in this case essentially subject to the same delay times or different delay times of the signals are in this case in general caused only by manufacturing tolerances or minor line length differences. Thus, in this case, the relative position of the flanks of the data signals and of the clock signals remains essentially unchanged, thus resulting in data transmission at relatively high speed.

In the second case, in contrast, in which the signals for the bit clock and the word clock are transmitted in the opposite direction to the data, not only the manufacturing tolerances and the line lengths but also the PAD delay times for the introduction of the chip and the extraction of the signal out of the chip must be taken into account for the delay time differences. The total of all the delay time differences which occur when data signals and bit clock as well as word clock signals are transmitted in opposite directions is given by a so-called delay loop. The delay loop can be defined, for example, for a case in which the clock signals are transmitted from the radio-frequency module to the baseband module and the baseband module transmits the data to the radio-frequency module in time with the received clock signals, as follows: first of all, a clock signal is produced by the radio-frequency module. This clock signal is passed out of the radio-frequency module, thus resulting in the generation of a first delay time difference (T1) as a contribution to the delay loop. The transmission of this clock signal via a signal line to the baseband module results in a second delay time difference (T2), which is caused by the line lengths. The insertion of the clock signal from the signal line into the baseband module once again generates a delay time difference (T1). The data is then produced in synchronism with the received clock signal in the baseband module. The process of passing the data signal out of the baseband module results in a further delay time difference (T1). In this case as well, a line length of the data signal line results in a delay time difference (T2) for the transmission of the data signal to the radio-frequency module. A further delay time difference (T1) once again results from the insertion of the data signal into the radio-frequency module, in which the data signal is sampled and received. Thus, in addition to the manufacturing tolerances, this delay loop includes twice the contribution of a delay time difference (T2) resulting from the line lengths and four times the contribution of a delay time difference (T1) caused by clock and data signals being introduced to and extracted from corresponding modules.

Analogously to this, it is also possible to describe a delay loop for the case in which the clock signals are produced by the baseband module, and the radio-frequency module transmits the data signals to the baseband module.

When delay loops such as these occur, undisturbed reception of the data is in general no longer ensured if the delay time in the delay loop is in the same order of magnitude as half a clock period which is used for data transmission. Thus, for example, the period of duration for a clock frequency of 26 MHz is 38.5 ns. The time delays (T1) which are caused by the insertion and extraction of the respective signals are approximately 5 ns for the chip and housing technologies that are used in the mobile radio application field. This means that the problem of delay loops becomes a significant phenomenon even at the clock frequency of 26 MHz which is advantageously used for data transmission in the mobile radio field. These delay loops occur to a particular extent in the case of a digital interface on the one hand, if the baseband module receives monitoring data from the radio-frequency module, and on the other hand, if the radio-frequency module receives transmission data from the baseband module.

SUMMARY OF THE INVENTION

The object of the invention is to provide a method and a transmitting/receiving arrangement in which the difficulties which result in delay time differences during data transmission via a digital interface can be coped with.

In a method according to the invention, the data is transmitted via a bidirectional digital interface between two signal processing units in a radio. A data transmission clock signal and a first data signal, which is clocked in a corresponding manner to the data transmission clock signal, are transmitted via the interface in a first direction. Furthermore, a second data signal which is clocked in a corresponding manner to the data transmission clock signal that is received via the interface, is transmitted in the opposite, second direction via the interface. One major idea of the invention is that the second data signal be transmitted using a data transmission clock signal which is at a lower frequency than the data transmission clock signal being used for the transmission of the first data signal, or data bits are transmitted with M repetitions, where $M \geqq 1$, during transmission of the second data signal.

The method according to the invention thus allows the problem of the delay loops which occur to be solved in a simple manner, with little complexity, and makes it possible to eliminate their influence on correct sampling and reception. Since either the second data signal is transmitted at a lower data transmission clock frequency in a clocked manner, or the data bits being transmitted are transmitted more than once, it is possible to ensure that the transmission quality (bit error probability) is not significantly adversely effected, even in the critical second direction.

It has been found to be advantageous for the data to be transmitted in serial form. This makes it possible to minimize the number of lines between the signal processing units, and to design the interface such that it is compact and space-saving.

If a first signal processing unit is in the form of a baseband module and the second signal processing unit is in the form of a radio-frequency module, then it has been found to be particularly advantageous for the payload data bits to be transmitted from the baseband module to the radio-frequency module to be transmitted at least twice and thus with at least a single repetition. The repeatedly transmitting payload data bits are transmitted directly successively in a suitable manner. This makes it possible to effectively eliminate any disturbing influence on the delay loops which occur during payload data transmission between the baseband module and the radio-frequency module. This can be achieved in an advantageous manner without adversely affecting the other signal transmissions between the radio-frequency module and the baseband module via the digital interface. In particular, in this case, the transmission quality between the two modules is not influenced, and received data can still be transmitted from the radio-frequency module to the baseband module at the maximum transmission rate in which case this maximum transmission speed is not adversely affected by the repeated transmission of transmission data from the baseband module to the radio-frequency module.

It is advantageous for the payload data which is transmitted from the baseband module and is received in the radio-frequency module to be checked by means of an automatic state device, and for a payload data bit to be identified as having been received when it has the same logic state N times, where $N \leqq m$, successively, in particular at least twice successively. This makes it possible to ensure reliable detection and reception of the transmission data in the radio-frequency module despite any delay loops that occur. The number of times for which the same logic state of successive transmission data bits must be detected in order to make it possible to assess a payload data bit to be transmitted as being identified can be chosen to be flexible. This makes it possible to minimize the disturbing influence of delay loops on payload data transmission from the baseband module to the radio-frequency module.

It is possible to provide for a first signal processing unit to be in the form of a baseband module, and for the second signal processing unit to be in the form of a radio-frequency module. It is clearly advantageous for monitoring data which is contained in the second data signal to be transmitted from the radio-frequency module to the baseband module clocked with a data transmission clock signal which is at a lower frequency, in particular at a lower bit clock frequency, than that data transmission clock signal which is used for the transmission of the first data signal, which contains monitoring data. This makes it possible to essentially completely suppress the disturbing influence of the delay loops which occur during the transmission of monitoring data from the radio-frequency module to the baseband module and to ensure reliable detection and reception of the monitoring data in the baseband module. Furthermore, this makes it possible to ensure that the time-critical monitoring information which is transmitted from the baseband module to the radio-frequency module is not influenced and, furthermore, can be transmitted at the maximum bit clock frequency, thus making it possible to ensure a minimal delay time and the maximum data throughput for this monitoring data transmission.

It is possible to provide for the data signals which are transmitted between the signal processing units and which contain the monitoring data to be transmitted by means of a single signal line, thus making it possible to further reduce the number of signal lines for the digital interface.

It is possible to provide for the monitoring data to be requested from the radio-frequency module by means of a message from the baseband module, and for the frequency of the data transmission clock signal to be reduced for transmission of the address part of the message to the radio-frequency module or for transmission of the monitoring data to the baseband module and of the address part of the message to the radio-frequency module. In order to make it possible to ensure that the information for requesting and transmission of the monitoring data is transmitted as reliably as possible, it is, alternatively, possible to decide whether the address part of the request message is or is not transmitted at a reduced clock frequency in the same way as the requested monitoring data. This option allows the transmission of the monitoring data to the baseband module to be optimized in the sense of reducing the disturbing influence of the delay loops as effectively as possible.

It is possible to provide for the frequency of the data transmission clock signal for clocked transmission of the second data signal to be reduced by an integer fraction in comparison to the frequency of the data transmission clock signal with which the first data signal is transmitted in a clocked manner. In particular, it is possible to minimize the influence of the delay loops when the clock frequency for transmission of the second data signal is half or a quarter of the clock frequency with which the first data signal is transmitted in a clocked manner.

A transmitting/receiving arrangement according to the invention in a radio, in particular a mobile radio, comprises a first and a second signal processing unit, which are electrically connected via a digital interface for bidirectional data transmission. The two signal processing units are designed such that a data transmission clock signal and a first data signal (which is clocked in a corresponding manner to the data transmission clock signal) are transmitted between them in a first direction via the interface, and a second data signal (which is clocked in a corresponding manner to the data transmission clock signal that is received via the interface) is transmitted in the opposite, second direction via the interface. One major idea of the invention is for the transmitting/receiving unit to have means which are designed such that the second data signal is transmitted clocked with a data transmission clock signal which is at a lower frequency than the data transmission clock signal that is used for the transmission of the first data signal, or for the transmission of data bits to be carried out with M repetitions, where $M \geq 1$, during the transmission of the second data signal.

The transmitting/receiving arrangement according to the invention allows, in the manner which has already been explained, essentially complete elimination of the disturbing influence of the delay loops which are caused by delay time differences during signal transmission.

It is possible to provide for a first digital multiconductor connection to be formed between the signal processing units, comprising:
- at least one data line, which is designed for serial transmission of the payload data,
- a bit clock line, which is designed for transmission of a bit clock signal, with each clock period being associated with in each case one bit of the data line, and
- a word clock line, which is designed for indication of the start of transmission of a sequence of bits on the data line.

It is also possible to provide for a second digital multiconductor connection to be arranged between the signal processing units, comprising:
- at least one data line, which is designed for serial transmission of the monitoring data,
- a bit clock line, which is designed for transmission of a bit clock signal, with each clock period being associated with one bit of the data line, and
- a word clock line, which is designed for indication of the start of transmission of a sequence of bits on the data line.

The refinement of the first and of the second multiconductor connection of the digital interface allows the signal connections between the signal processing units to be formed with a minimum number of lines, and allows the transmitting/receiving arrangement to be designed such that it is simple, involves little complexity and is space-saving.

BRIEF DESCRIPTION OF THE DRAWINGS

One exemplary embodiment of the invention will be explained in more detail in the following text with reference to the schematic drawings, in which.

PREFERRED EMBODIMENTS OF THE INVENTION

Figure 1:
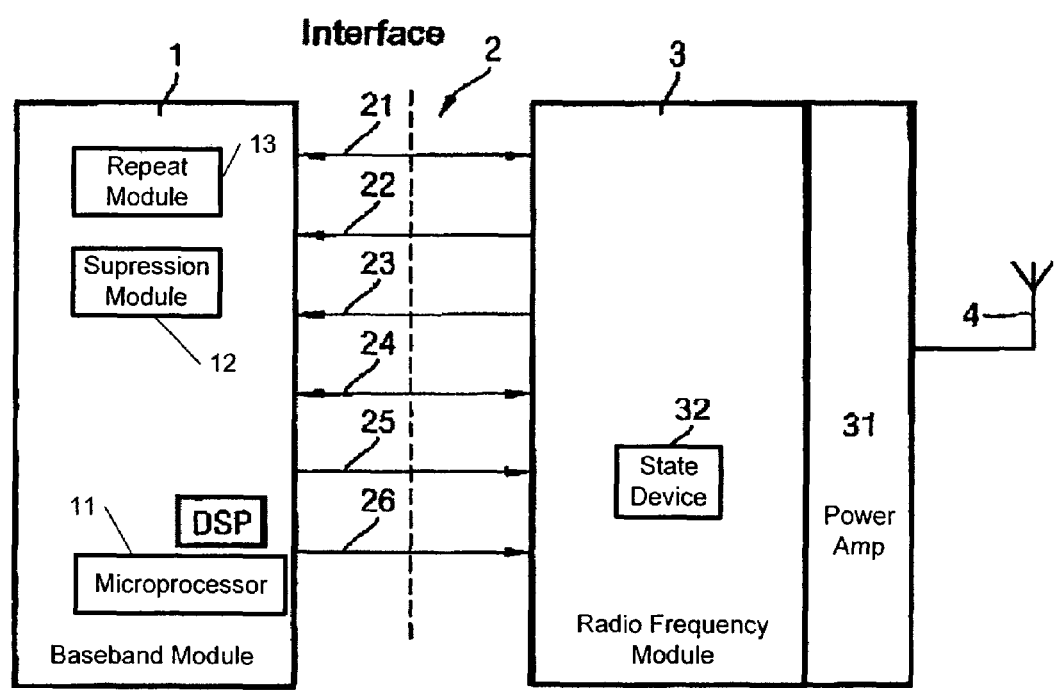
FIG. 1 shows a block diagram of one embodiment of the transmitting/receiving arrangement according to the invention, with a first digital multiconductor connection for transmission of payload data via a digital interface, and a second digital multiconductor connection for transmission of monitoring data via the digital interface.

A transmitting/receiving arrangement according to the invention for the processing of signals for mobile radio (FIG. 1) has a baseband module 1. The baseband module 1 is connected via a digital interface 2 to a radio-frequency module 3. The digital interface 2 between the baseband module 1 and the radio-frequency module 3 comprises a first digital multiconductor connection, which is designed for transmission of payload data (which is to be transmitted) and of received payload data between the baseband module 1 and the radio-frequency module 3. This first digital multiconductor connection comprises a data line 21, a bit clock line 22 and a word clock line 23.

The data line 21 is designed for bidirectional transmission of signals. The payload data which is to be transmitted and the received payload data are transmitted via the data line 21. The payload data is thus transmitted via just a single data line. However, it is also possible to provide for the payload data which is to be transmitted to be transmitted via a first data line, and for the received payload data to be transmitted via a second data line of this first digital multiconductor connection. The data line 21 may also be in the form of a differential signal line.

The bit clock line 22 is designed for transmission of a clock signal, with each clock period being associated with in each case one bit of the data line 21. The word clock line 23 is designed for indication of the start of transmission of a sequence of bits on the data line 21. The first digital multiconductor connection in the exemplary embodiment is thus in the form of a three-conductor connection between the baseband module 1 and the radio-frequency module 3.

Furthermore, the digital interface 2 comprises a second digital multiconductor connection, which has a data line 24, a bit clock line 25 and a word clock line 26. In the exemplary embodiment, the data line 24 is in the form of a bidirectional data line 24. Monitoring data and/or configuration data is transmitted in serial form from the baseband module 1 to the radio-frequency module 3 via the bidirectional data line 24. Data which, for example, has been requested in advance via a specific request message from the baseband module 1 can also be transmitted from the radio-frequency module 3 to the baseband module 1 via this bidirectional data line 24. The bit clock line 25 is intended for transmission of a clock signal, with each clock period in each case being associated with one bit of the data line 24 in this case as well. The word clock line 26 is intended for indication of the start of transmission of a sequence of bits on the data line 24.

The bit clock line 22 and the word clock line 23 of the first digital multiconductor connection are designed for signal transmission from the radio-frequency module 3 to the baseband module 1. The bit clock line 25 and the word clock line 26 of the second digital multiconductor connection are designed for signal transmission from the baseband module 1 to the radio-frequency module 3.

The baseband module 1 is used for digital processing of payload data to be transmitted and of received payload data and comprises a digital signal processor DSP for processing the payload data as well as a microprocessor 11 for controlling the radio-frequency module 3 by means of monitoring data and/or configuration data. Furthermore, this microprocessor 11 controls the functional procedure for the transmitting/receiving arrangement. In addition, the baseband module 1 has a unit 12 which is used to suppress the disturbing influence of delay loops during the transmission of monitoring data to the baseband module, with the unit 12 reducing the clock frequency of the baseband module 1 in order to make it possible for the radio-frequency module 3 to correctly detect and receive the monitoring data. Furthermore, the baseband module 1 has a further unit 13, which causes the transmission data to be transmitted repeatedly from the baseband module 1 to the radio-frequency module 3, in order to reduce the influence of the delay loops which occur during the transmission of transmission data to the radio-frequency module 1, such that these delay loops no longer occur as a disturbing phenomenon during the detection and reception of transmission data. The units 12 and 13 may be formed in a common unit. It is also possible to provide for the functions of the units 12 and 13 to be carried out by the microprocessor 11.

The radio-frequency module 3 is used both for conversion of the received signal to a baseband signal for the baseband module 1, and for conversion of a baseband signal, which is produced by the baseband module 1, to a radio-frequency transmission signal. In the present exemplary embodiment, it comprises a power amplifier 31. This power amplifier 31 may also be in the form of an external component. The output side of the power amplifier 31 is connected to an antenna 4, which is designed for transmission of radio-frequency modulated signals. Furthermore, the radio-frequency module 3 has an automatic state device 32, which is used to detect the transmission data that is transmitted from the baseband module 1. The automatic state device 32 may also be implemented in the form of software in the radio-frequency module 3.

The interface 2 of the transmitting and receiving arrangement may have a synchronization line (which is not illustrated in FIG. 1) which is used to define the start and end of transmission time slots in a transmission signal. Signal transmission between the radio-frequency module 3 and the baseband module 1 can be started or interrupted via a further digital signal line, which is not illustrated. This further digital signal line can be used to allow the radio-frequency module 3 to cause the baseband module 1 to carry out a new action, in particular new transmission of data.

The completed digital configuration of the interface 2 allows the baseband module 1 to be designed completely using digital circuit technology. There is no need for the normal hybrids in the baseband module 1, that is to say partially analogue and partially digital circuit technology in the reception path and the transmission path. Furthermore, the complete separation of the respective digital payload data transmission from the configuration data transmission allows the design of the baseband module 1 to be considerably simplified. This is possible because there is no coupling between the payload data that is produced by the digital signal processor DSP and the monitoring data which is produced by the microprocessor 11.

Figure 2:
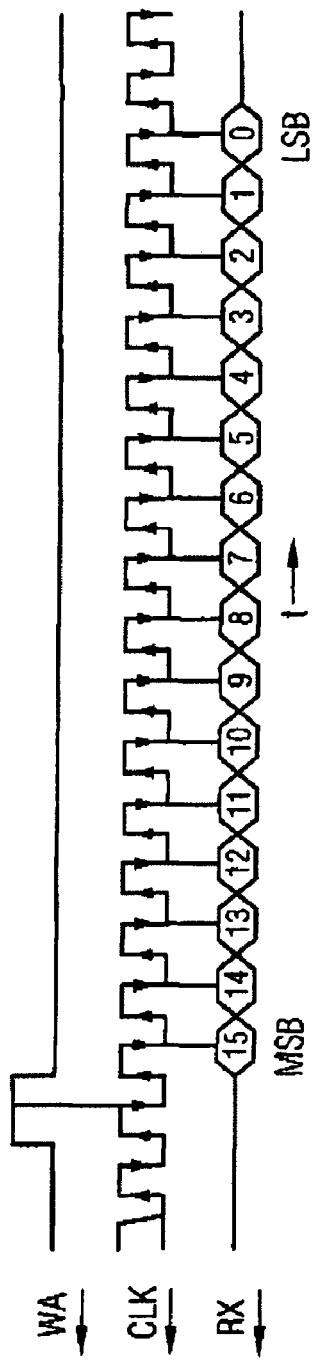
FIG. 2 shows an exemplary illustration of the signal profiles over the signal lines of the first digital multiconductor connection for transmission of the payload data via the digital interface as shown in FIG. 1, with the same transmission direction for the data, word and bit clock signals.

FIG. 2 shows an exemplary illustration of signal profiles on the data line 21 (FIG. 1), of the bit clock line 22 and on the word clock line 23 of the first digital multiconductor connection for payload data transmission in the receiving direction RX. The word clock signal WA is transmitted via the word clock line 23, and the data transmission clock signal or bit clock signal CLK is transmitted via the bit clock line 22 from the radio-frequency module 3 to the baseband module 1. The received payload data is likewise transmitted via the bidirectional data line 21 from the radio-frequency module 3 to the baseband module 1 by the signal RX. The serial transmission of the received payload data via the data line 21 is in this case organised in the form of messages, with a message in the present exemplary embodiment comprising 16 bits arranged in serial form. In this case, the most significant bit (MSB) is transmitted first, and the least significant bit (LSB) is transmitted last. One modulation bit of the data line 21 is in each case clocked into the radio-frequency module 23 on each falling clock flank of the periodic clock signal on the bit clock line 22, the so-called bit clock.

The word clock signal on the word clock line 23 defines the start of the transmission of a message, by a falling clock flank in the bit clock rate occurring at the same time as a word clock pulse. The data transmission then starts on the next falling clock flank of the bit clock.

In the case where the payload data signal RX, the bit clock signal CLK and the word clock signal WA are transmitted in the same direction, as is illustrated in FIG. 2, no delay loops occur during the transmission of these signals. Thus, in this case, the maximum bit clock frequency and the maximum data transmission rate can be achieved without adversely affecting the detection and the reception of the data.

Figure 3:
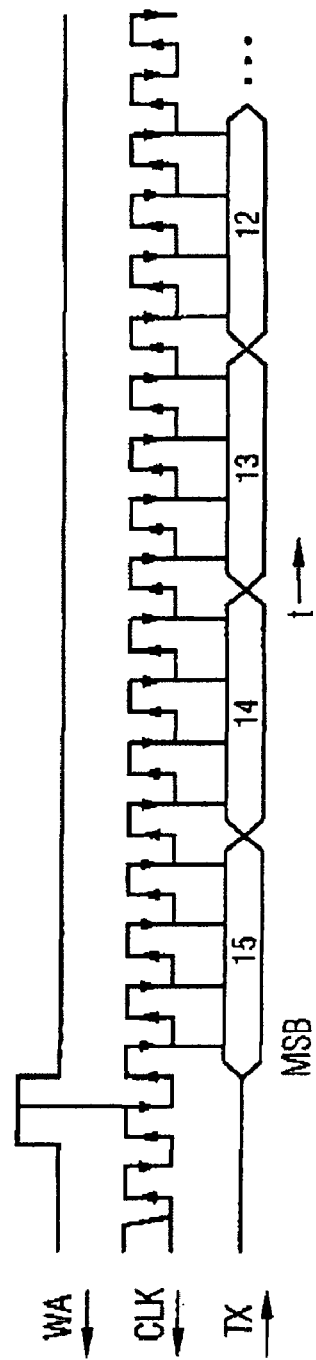
FIG. 3 shows an exemplary illustration of signal profiles over the signal lines of the first digital multiconductor connection for multiple transmission according to the invention of data bits with the data signal and word clock signal as well as the bit clock signal being transmitted in opposite directions.

FIG. 3 shows a schematic illustration of signal profiles, in which a payload data signal TX to be transmitted, and which is transmitted via the data line 21, is transmitted in the opposite direction from the bit clock signal CLK, which is transmitted via the bit clock line 22, and the word clock signal WA, which is transmitted via the word clock line 23. The problem of delay loops occurs in this situation. In the diagram illustrated in FIG. 3, the bit clock signal CLK and the word clock signal WA are transmitted from the radio-frequency module 3 to the baseband module 1, and the payload data signal TX is transmitted from the baseband module 1 to the radio-frequency module 3. Transmission data is thus transmitted to the radio-frequency module 3. In order to make it possible to sample the payload data of the radio-frequency module 3 despite the delay loop, the transmission data is transmitted to the radio-frequency module 3 with a repetition factor of M=3. As is shown in FIG. 3, each payload data bit to be transmitted is transmitted four times directly successively, that is say is repeated three times. The bit clock signal CLK is also at the maximum frequency of 26 MHz, so that four signal flanks of the unchanged bit clock signal CLK in each case occur within each four successively transmitted identical payload data bits. As can be seen from FIG. 3, four falling signal flanks of the bit clock signal CLK occur, for example, when the payload data bit 15 is transmitted four times.

Figure 4:
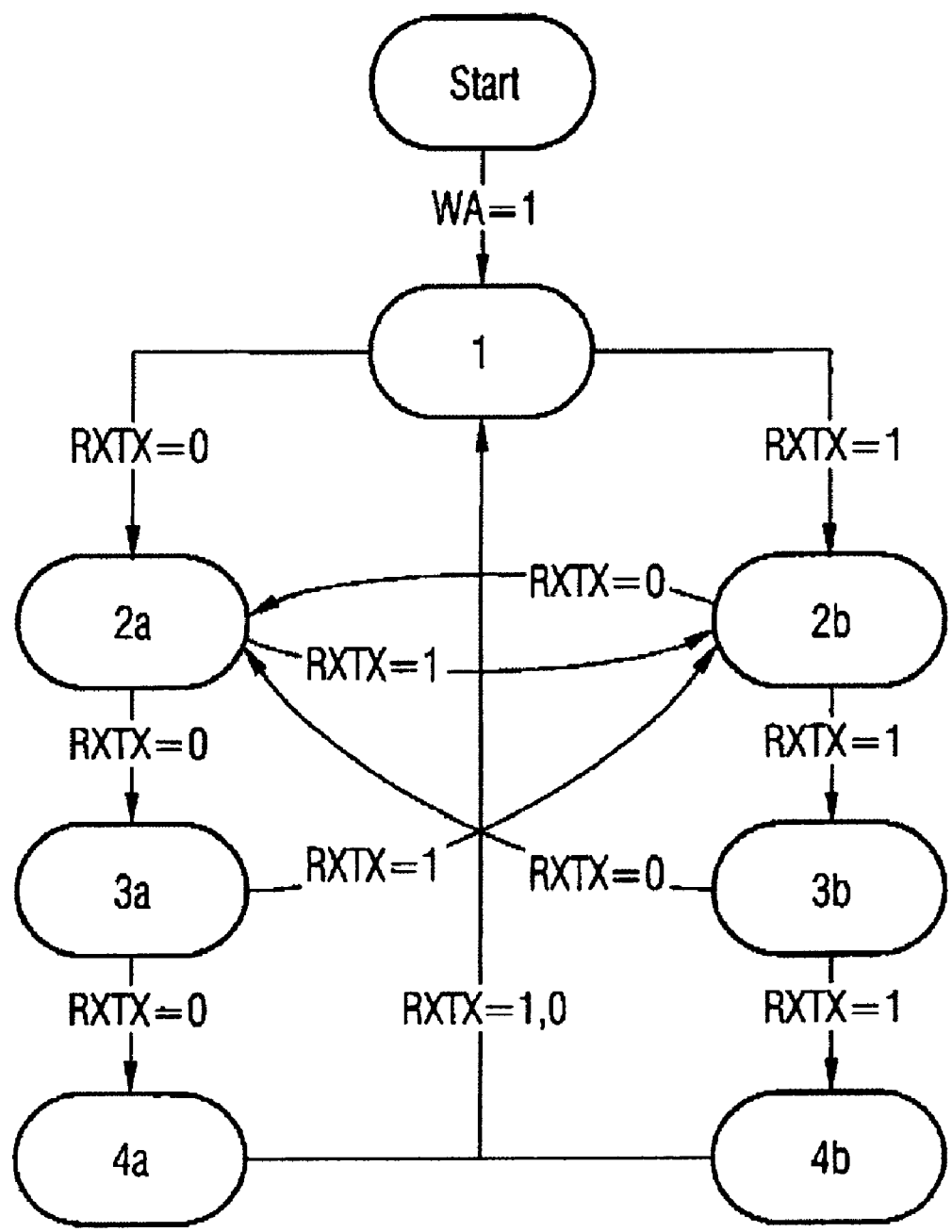
FIG. 4 shows a schematic illustration of the functional principle of an automatic state device for identification of received data without errors.

The transmission data, which is transmitted to the radio-frequency module 3 as shown in FIG. 3, is detected by means of an automatic state device (FIG. 4). The automatic state device can receive the data transmitted as shown in FIG. 3 without errors despite delay time differences between the received payload data and the internal bit clock CLK. The automatic state device 32 (FIG. 1) is started and starts to check the received payload data while the word clock signal WA is in a logic state "1" and data is transmitted to the radio-frequency module 3. When the automatic state device is in the position 1, the logic state of the first received data bit is defined. If the first data bit has a logic state "0", then the second received data bit is checked in the position 2a. If this likewise has the logic state "0" then the logic state of the third received data bit is checked in the position 3a of the automatic state device. If the logic state of the third received data bit is likewise "0", then error-free reception of the first payload data bit, which is being transmitted four times, or has been repeated three times, in the exemplary embodiment, is identified in the position 4a of the automatic state device. Error-free reception of the payload data is in this case identified because the same logic state "0" of the successively received data bits has occurred at least three times successively. In order to check the receipt of data bits, the automatic state device is incremented on the falling signal flank of the bit clock signal CLK, and this procedure is carried out until the agreed number of successive data bits with the same logic state is reached.

In consequence, if, for example, the logic state of the second received data bit is identified as "1" in position 2a of the automatic state device, counting of the required number of successive data bits with the same logic state is in this case restarted with the logic state "1". If the logic state "1" of the successive data bits is then also identified, for example, in the positions 2b and 3b, then error-free reception of the payload data bit is identified by the logic state "1" in the position 4b of the automatic state device. The further position sequences shown in FIG. 4 shall be understood in an analogous manner. The essential feature is that a received data item or a payload data bit which has been transmitted more than once is identified as having been correctly received when at least a predetermined number of data bits with the same logic states are identified successively.

Figure 5:
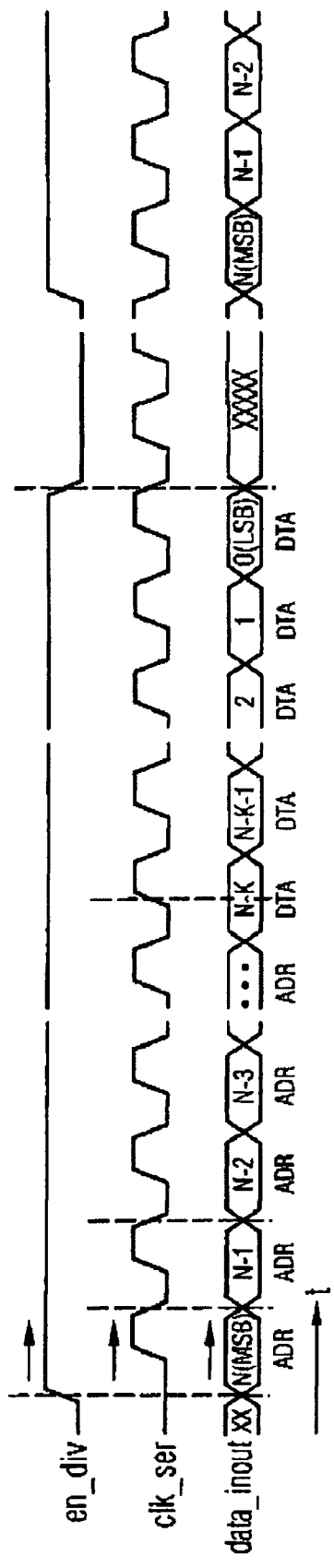
FIG. 5 shows an exemplary illustration of signal profiles over the signal lines of the second digital multiconductor connection for transmission of the monitoring data via the digital interface as shown in FIG. 1.

FIG. 5 shows a time profile for the signals on a bidirectional data line 24, on the bit clock line 25 and on the word clock line 26 of the second digital multiconductor connection. The second digital multiconductor is also designed for serial data transmission via the bidirectional data line 24. The signal en_div is transmitted via the work clock line 26, the signal clk_ser is transmitted via bit clock line 25, and the signal data_inout is transmitted via the data line 24. A module selection process is carried out via the word clock line 26, by means of which the radio-frequency module 3 which receives the configuration data or a circuit element in it can be activated. The transmission protocol for the configuration data and/or for the monitoring data via the data line 24 is also organised on a message basis, in which case the messages may either be individual messages or a group of directly successive messages.

One message in this case comprises a defined number N+1 of bits, for example 24 bits, and is composed of an address part and a data part. The address part in this case comprises K bits, and is referred to as ADR, while the data part is referred to as the DTA and comprises N−K+1 bits. In the case of a message group, which sends data to successive addresses, the address part would be omitted if the initial address is known to the receiver. The address then defines the destination, for example a function block in the radio-frequency module 3, to which the data is intended to be transmitted. A specific configuration message may be used for the transmission of a message group and, before the start of a message, defines the start, the length and the start/destination address of the group. A message group is used, for example, to set the basic configuration of the transmission arrangement on a time-efficient basis. When individual messages are transmitted, the time of message transmission in general also governs a time of activation of the new setting or configuration of the transmitting and receiving arrangement. It is thus particularly important to maintain a short delay time for the transmission of the monitoring data and/or of the configuration information from the baseband module 1 to the radio-frequency module 3. The information transmission is not influenced in this case, since the maximum bit clock frequency of, for example, 26 MHz can be used owing to the fact that all the signal transmissions take place in the same transmission direction.

Figure 6:
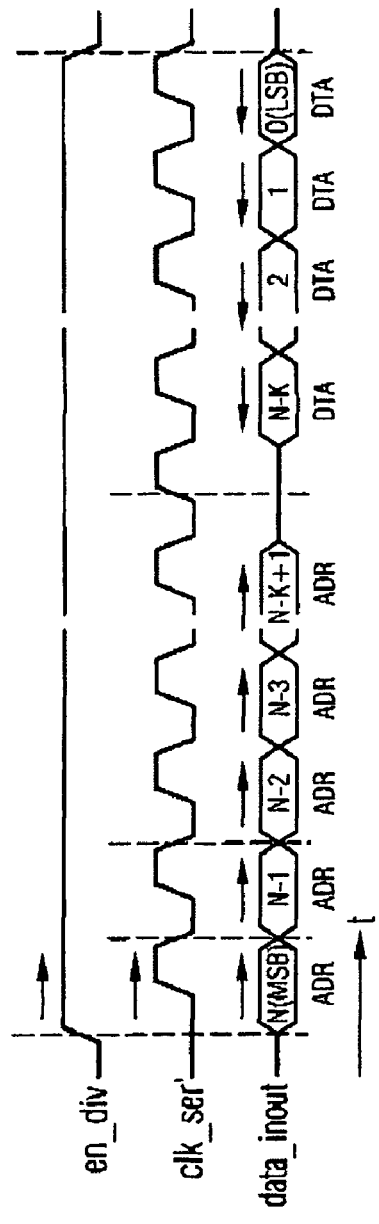
FIG. 6 shows a schematic illustration of signal profiles over the signal lines of the second digital multiconductor connection for the transmission of monitoring data to a signal processing unit which requests this data by means of a message.

As is shown in FIG. 6, monitoring data and/or configuration data can also be transmitted via the bidirectional data line 24 from the radio-frequency module 3 to the baseband module 1 by means of the signal data_inout, which was previously requested by the baseband module 1 by means of a specific request message. This request message may, for example, be formed in such a way that one bit in the address part is used for indication, in order to access the address for reading but not for writing. This request message has no data part. After a short pause at the end of the address part, the radio-frequency module 3 transmits the data DTA as requested by the baseband module 1 to the baseband module 1. This is illustrated in FIG. 6, by the arrow above the data bits DTA. The monitoring data DTA is in this case transmitted in the opposite direction to the bit clock signals clk_ser and to the word clock signals en_div. According to the invention, a bit clock clk_ser' at a lower frequency than the bit clock clk_ser is chosen for the transmission of the address part ADR and of the monitoring data DTA. The reduced bit clock clk_ser' is set as an integer fraction of the bit clock clk_ser and may, for example, be half or one quarter of the bit clock clk_ser. If a clock frequency of 26 MHz is chosen as a bit clock clk_ser, then, for example, the reduced bit clock clk_ser' may be at a frequency of 13 MHz or 6.5 MHz, this being the frequency at which the address part ADR and the monitoring data DTA are transmitted. It is also possible to provide, although this is not illustrated, for the address part ADR to be transmitted at the bit clock rate clk_ser of 26 MHz, and for the switching to the reduced bit clock rate clk_ser' to take place only after the pause at the end of the address part ADR, with the monitoring data DTA being transmitted at this reduced bit clock rate clk_ser'. The baseband module 1 is designed such that the bit clock frequency for the reception of monitoring data from the radio-frequency module 3 can be reduced for a specific time period. Furthermore, the radio-frequency module 3 is designed such that it can handle these different bit clock frequencies.

The method according to the invention and the transmitting/receiving arrangement according to the invention make use of less time-critical procedures for the transmission of monitoring data from the radio-frequency module 3 to the baseband module 1, and of the transmission of transmission data from the baseband module 1 to the radio-frequency module 3 essentially without adversely affecting the rest of the data transfers via the interface 2 between these modules 1 and 3. The reduction of the data transmission clock frequency or the repetition of the payload data bits to be transmitted by a signal processing unit by a factor of $M \geq 1$ effectively eliminates the influence of the delay loops for the sampling and reception of data. The reduction of the data transmission clock frequency on the one hand and the repeated transmission of payload data bits (which is equivalent to a reduction of the data rate) on the other hand may be carried out selectively, thus making it possible to individually match the reduction of the influence of a delay loop to the respectively given system preconditions. This therefore ensures that the respective measure—reduction of the data transmission clock frequency or repetition of the data to be transmitted with a corresponding repetition factor M—can be set on an individual basis such that the influence of the delay loops and the delay time differences is no longer a disturbing phenomena, or else a relatively minor increase in delay time differences has no disturbing effect.

The invention results in the delay loops being accurately compensated for where they occur, without any influence on the transmission characteristics of the other system transmission modes in which no undesirable time delays occur.

In particular, the method according to the invention and the transmitting/receiving arrangement according to the invention make it possible for received data to be transmitted from the radio-frequency module 3 to the baseband module 1 at the maximum speed without any change, which corresponds to the greatest portion of the data transfer between the radio-frequency module 3 and the baseband module 1. In contrast, repetition of the transmission data which is transmitted from the baseband module 1 to the radio-frequency module 3 poses no problems, since the amount of transmission data is relatively small in comparison to the received data, and this transmission data can in any case be transmitted at a lower effective speed. For example only 157 modulation bits need be transmitted for a transmission data burst for GMSK modulation, and only 469 modulation bits need be transmitted for a transmission data burst for 8-PSK modulation, while, on the other hand, approximately 10,000 bits must be transmitted for one received data burst. Owing to this large number of bits, received data cannot be buffer-stored in the radio-frequency module 3, in contrast to the transmission data. The received data must therefore be transmitted to the baseband module 1 essentially immediately after its creation. For example, in the case of GSM or GSM/EDGE, this corresponds to an effective data transmission rate of 17.3 MHz. For this reason, the system clock rate of 26 MHz, which is already available, is advantageously used as the bit clock rate for transmission of the received data. Since, as already mentioned, the transmission data represents a relatively small amount of data in comparison to the received data, this transmission data can be buffer-stored. The method according to the invention allows the effective transmission speed to be chosen in the integer fractions of the bit clock rate, in particular of the 26 MHz bit clock rate. The fraction is preferably chosen such that any delay loops which occur in general have no influence on the sampling and reception of data in the modules 1 and 3. The transmission frequency of the transmission data may, however, furthermore also be reduced such that the modulation bits are transmitted without any buffer storage. For example, in the case of GMSK modulation and on the assumption that 1 bit is transmitted per symbol, the modulation bits would be repeated 96 times for a bit clock rate of 26 MHz. On the assumption that 3 bits are transmitted per symbol for 8-PSK modulation, the modulation bits 32 would be repeated 32 times. However, the GMSK symbols and the 8-PSK symbols are advantageously coded in a 4-bit word. 4 bits are thus transmitted per symbol, irrespective of the type of modulation. The maximum repetition rate in this special case is 24.

It is also possible for the time-critical monitoring information, which is transmitted from the baseband module 1 to the radio-frequency module 3, still to be transmitted at the maximum data transmission clock frequency or bit clock frequency. This ensures a minimal delay time and the maximum data transfer.

We claim:

1. A method for transmission of data, comprising:
    transmitting a data transmission clock signal and a first data signal, which is clocked in a corresponding manner to the data transmission clock signal, via a bidirectional digital interface between two single processing units in a radio in a first direction and
    transmitting a second data signal, which is clocked in a corresponding manner to the data transmission clock signal that is received via the interface, in an opposite second direction, via the interface, wherein the transmission of the second data signal uses a data transmission clock signal which is at a lower frequency than the data transmission clock signal which is used for the transmission of the first data signal, or wherein data bits with M repetitions, where $M \geq 1$, are transmitted during transmission of the second data signal.

2. The method according to claim 1, wherein the data is transmitted between the signal processing units in serial form.

3. The method according to claim 1, wherein a word clock signal is transmitted as a further signal in the first direction via the interface.

4. The method according to claim 3, wherein the first data signal and the second data signal are transmitted via a common signal line, and the data transmission clock signal and the word clock signal are each transmitted via a separate signal line.

5. The method according to claim 4, wherein the data transmission clock signal is a bit clock signal.

6. The method according to claim 1, wherein a first signal processing unit is in the form of a baseband module and the second signal processing unit is in the form of a radio-frequency module.

7. The method according to claim 1, wherein the data signals are payload data signals, and in that the payload data bits, which are transmitted with $M \geq 1$ repetitions are transmitted directly successively.

8. The method according to claim 7, wherein at least two flanks of the data transmission clock signal for the clock transmission of the first payload signal occur within the directly successive payload data bits which are transmitted with $M \geq 1$ repetitions.

9. The method according to claim 7, wherein, during the transmission of payload data, in particular transmission data, in a data signal, each payload data bit is transmitted by $M=3$ repetitions, in particular without any change to the frequency of the data transmission clock signal.

10. The method according to claim 7, wherein a first signal processing unit is in the form of a baseband module and the second signal processing unit is in the form of a radio-frequency module, and wherein the payload data bits which are to be transmitted from the baseband module to the radio-frequency module are transmitted at least twice.

11. The method according to claim 10, wherein the payload data which is transmitted from the baseband module and is received in the radio-frequency module is checked by means of an automatic state device, and the payload data bit is identified as having been received when it has the same logic state N times successively, in particular at least twice successively.

12. The method according to claim 11, wherein in order to check the received payload data bits, groups of two or more successive payload data bits with the same logic state are identified automatically by the automatic state device, and synchronization to the finding of such groups is carried out automatically on identification of the data bit sequences with errors.

13. The method according to claim 11, wherein the checking of a received payload data bit is repeated successively up to N times, where $N \leq M$, until the same logic state of this received payload data bit is identified.

14. The method according to claim 1, wherein the data signals are monitoring data signals, and the monitoring data signals which are transmitted between the signal processing units are transmitted by means of a single signal line.

15. The method according to claim 14, wherein a first signal processing unit is in the form of a baseband module and the second signal processing unit is in the form of a radio-frequency module, and wherein the monitoring data is transmitted from the radio-frequency module to the baseband module clocked with a data transmission clock signal which is at a lower frequency than that data transmission clock signal which is used for the transmission of the first monitoring data signal.

16. The method according to claim 15, wherein the monitoring data is requested from the radio-frequency module by means of a message from the baseband module, and the frequency of the data transmission clock signal is reduced for transmission of the address part of the message to the radio-frequency module or for transmission of the monitor data to the baseband module and of the address part of the message to the radio-frequency module.

17. The method according to claim 15, wherein the reduction in the frequency of the data transmission clock signal is carried out by means of the baseband module.

18. The method according to claim 14, wherein the frequency of the data transmission clock signal for clocked transmission of the second data signal is reduced by an integer fraction, in particular to half or to a quarter, in comparison to the frequency of the data transmission clock signal with which the first data signal is transmitted in a clocked manner.

19. A transmitting/receiving, comprising:
    a first and a second signal processing unit of a radio, in particular a mobile radio, which are electrically connected via a digital interface for bidirectional data transmission, in which, between the signal processing units
    a data transmission clock signal and a first data signal are transmitted in a first direction via the interface, and
    a second data signal is transmitted in the opposite, second direction via the interface, and
    means which are designed such that the second data signal is transmitted clocked with a data transmission clock signal which is at a lower frequency than the data transmission clock signal that is used for the transmission of the first data signal, or in that the transmission of data bits is carried out with M repetitions, where $M \geq 1$ during the transmission of the second data signal.

20. The transmitting/receiving arrangement according to claim 19, wherein the first and the second data signal can be transmitted via one signal line, and the data transmission clock signal can be transmitted via a separate signal line.

21. The transmitting/receiving arrangement according to claim 20, wherein the data transmission clock signal is a bit clock signal.

22. The transmitting/receiving arrangement according to claim 21, wherein the first and the second data signal can be transmitted via one signal line, and the data transmission clock signal (which, in particular, is a bit clock signal) can be transmitted via a separate signal line, and wherein the arrangement further comprises a first digital multiconductor connection, which comprises:
    at least one data line, which is designed for serial transmission of the payload data,
    a bit clock line, which is designed for transmission of a bit clock signal, with each clock period being associated with in each case one bit of the data line, and
    a word clock line, which is designed for indication of the start of transmission of a sequence of bits on the data line.

23. The transmitting/receiving arrangement according to claim 21, wherein the first and the second data signal can be transmitted via one signal line, and the data transmission clock signal (which, in particular, is a bit clock signal) can be transmitted via a separate signal line, and wherein the arrangement further comprises a second digital multiconductor connection, which comprises:
    at least one data line, which is designed for serial transmission of the monitoring data,
    a bit clock line, which is designed for transmission of a bit clock signal, with each clock period each being associated with one bit of the data line, and
    a word clock line, which is designed for indication of the start of transmission of a sequence of bits on the data line.

24. The transmitting/receiving arrangement according to claim 19, wherein a word clock signal can be transmitted as a further signal via a separate signal line in the first direction via the interface.

25. The transmitting/receiving arrangement according to claim 19, wherein a first signal processing unit is in the form of a baseband module, and the second signal processing unit is in the form of a radio-frequency module.

26. The transmitting/receiving arrangement according to claim 25, wherein the means are designed such that the monitoring data which is contained in the second data signal is transmitted from the radio-frequency module to the baseband module clocked with a data transmission clock signal which is at a lower frequency than that data transmission clock signal which is used for the transmission of the monitoring data that is contained in the first data signal.

27. The transmitting/receiving arrangement according to claim 25, wherein the means are designed such that the payload data bits which are to be transmitted from the baseband module to the radio-frequency module are transmitted with $M \geq 1$ repetitions, in particular M=3 repetitions.

28. The transmitting/receiving arrangement according to claim 25, wherein the radio-frequency module has an automatic state device, with the automatic state device being designed such that it checks payload data bits which are received by the baseband module, and identifies a payload data bit as having been received when it has the same logic state N times successively, where $N \leq M$, in particular at least twice successively.

29. The transmitting/receiving arrangement according to claim 28, wherein the automatic state device is designed such that, in order to check the receipt of payload data bits, it automatically identifies groups of two or more successive payload data bits with the same logic state, an automatic synchronisation to the finding of these groups can be carried out on identification of data bit sequences with errors.

30. The transmitting/receiving arrangement according to claim 25, wherein the radio-frequency module is designed such that it can process different data transmission clock frequencies of the baseband module.

31. The transmitting/receiving arrangement according to claim 19, wherein the frequency of the data transmission clock signal with which the second data signal is transmitted is an integer fraction, in particular, half or a quarter of the frequency of the data transmission clock signal with which the first data transmission signal is transmitted.

32. The transmitting/receiving arrangement according to claim 19, wherein the data signals are payload data signals, and in that the means are designed such that the payload data bits, which are transmitted with $M \geq 1$ repetitions, are transmitted directly successively.

* * * * *

UNITED STATES PATENT AND TRADEMARK OFFICE
CERTIFICATE OF CORRECTION

PATENT NO. : 7,433,394 B2
APPLICATION NO. : 10/902530
DATED : October 7, 2008
INVENTOR(S) : Berndt Pilgram et al.

It is certified that error appears in the above-identified patent and that said Letters Patent is hereby corrected as shown below:

At column 4, line 46, "$N \leqq m$" should read --$N \leq m$,--

At column 14, line 13, "receiving" should read --receiving/arrangement,--

At column 14, line 28, "$M \geqq 1$" should read --$M \geq 1$,--

Signed and Sealed this

Twenty-seventh Day of January, 2009

JOHN DOLL
*Acting Director of the United States Patent and Trademark Office*